(12) United States Patent
Henttonen et al.

(10) Patent No.: US 9,973,321 B2
(45) Date of Patent: May 15, 2018

(54) SIGNALLING FOR USING OPERATING BAND COMBINATION

(71) Applicant: Nokia Technologies Oy, Espoo (FI)

(72) Inventors: Tero Henttonen, Espoo (FI); Chunli Wu, Beijing (CN); Benoist Pierre Sebire, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 235 days.

(21) Appl. No.: 14/824,375

(22) Filed: Aug. 12, 2015

(65) Prior Publication Data

US 2017/0048839 A1 Feb. 16, 2017

(51) Int. Cl.
| | |
|---|---|
| *H04W 72/04* | (2009.01) |
| *H04L 5/00* | (2006.01) |
| *H04W 8/22* | (2009.01) |
| *H04W 8/24* | (2009.01) |

(52) U.S. Cl.
CPC ............ *H04L 5/0091* (2013.01); *H04W 8/24* (2013.01)

(58) Field of Classification Search
CPC .... H04L 5/0091; H04L 5/0098; H04W 72/04; H04W 72/0406; H04W 72/0453; H04W 8/22
See application file for complete search history.

(56) References Cited

U.S. PATENT DOCUMENTS

| | | | | |
|---|---|---|---|---|
| 2012/0184281 A1* | 7/2012 | Kim | ................. | H04W 72/0453 455/450 |
| 2013/0142139 A1* | 6/2013 | Kitazoe | ................. | H04W 28/20 370/329 |
| 2013/0188580 A1* | 7/2013 | Dinan | ................. | H04W 52/281 370/329 |
| 2013/0242796 A1* | 9/2013 | Chen | ................. | H04W 36/0088 370/252 |
| 2014/0092825 A1 | 4/2014 | Bostroem et al. | | |
| 2015/0098425 A1 | 4/2015 | Bergljung et al. | | |
| 2016/0183260 A1* | 6/2016 | Sriram | ................. | H04W 72/048 370/329 |
| 2016/0262053 A1* | 9/2016 | Palm | ................. | H04L 5/001 |

(Continued)

FOREIGN PATENT DOCUMENTS

| | | | |
|---|---|---|---|
| EP | 2624649 A1 | 8/2013 | |
| WO | WO-2010076376 A1 | 7/2010 | |
| WO | WO 2015174904 A1 * | 11/2015 | ............ H04W 56/00 |

OTHER PUBLICATIONS

Ericsson; "Network-requested CA Band Combination Capability Signalling"; R2-142893; 3GPP TSG-RAN WG2 Meeting #86; May 19-23, 2014; Seoul, South Korea; whole document (20 pages).

(Continued)

*Primary Examiner* — Hoang-Chuong Q Vu
(74) *Attorney, Agent, or Firm* — Harrington & Smith

(57) ABSTRACT

A method includes transmitting information from an apparatus regarding at least one operating band combination. The information regarding the at least one operating band combination may comprise at least one of an index comprising a plurality of operating band combinations, and a bitmap relating to the index of operating band combinations. The method also includes selecting by the apparatus either a supported indicator or an unsupported indicator regarding the information. The method further includes transmitting, by the apparatus, the selected indicator.

20 Claims, 5 Drawing Sheets

(56) References Cited

U.S. PATENT DOCUMENTS

2016/0329937 A1* 11/2016 Shi .................. H04B 7/0417
2017/0006598 A1*  1/2017 Uemura ............ H04L 5/0048
2017/0094571 A1*  3/2017 Yu .................... H04W 36/08

OTHER PUBLICATIONS

Ericsson; "Network-requested CA Band Combination Capability Signalling"; R2-142894; 3GPP TSG-RAN WG2 Meeting #86; May 19-23, 2014; Seoul, South Korea; whole document (20 pages).

Ericsson; "Network-requested CA Band Combination Capability Signalling"; R2-142895; 3GPP TSG-RAN WG2 Meeting #86; May 19-23, 2014; Seoul, South Korea; whole document (2 pages).

Ericsson; "Network-requested CA Band Combination Capability Signalling"; R2-142896; 3GPP TSG-RAN WG2 Meeting #86; May 19-23, 2014; Seoul, South Korea; whole document (2 pages).

Mediatek Inc. et al.; "NAICS Open Issues"; R2-145364; 3GPP TSG-RAN2 #88 Meeting; Nov. 17-21, 2014; San Francisco, USA; whole document (5 pages).

Huawei et al.; "UE CA capability signaling for B5C"; R2-152245; 3GPP TSG-RAN WG2 Meeting #90; May 25-29, 2015; Fukuoka, Japan; whole document (3 pages).

Nokia Networks; "On NAICS Capability Signalling"; R2-152497; 3GPP TSG-RAN WG2 Meeting #90; May 25-29, 2015; Fukuoka, Japan; whole document (5 pages).

Intel Corporation et al.; "Additional MIMO/CSI capability for intra-band contiguous CA"; R2-152872; 3GPP TSG-RAN WG2 Meeting #90; May 25-29, 2015; Fukuoka, Japan; whole document (21 pages).

Huawei; "Study on RAN Sharing Enhancements for UMTS"; RP-150227; 3GPP TSG-RAN meeting #67; Mar. 9-12, 2015; Shanghai, China; whole document (5 pages).

3GPP TS 36.101 V13.0.0; "$3^{rd}$ Generation Partnership Project; Technical Specification Group Radio Access Network; Evolved Universal Terrestrial Radio Access (E-UTRA); User Equipment (UE) radio transmission and reception (Release 13)"; Jul. 2015; whole document (699 pages).

* cited by examiner

SIGNALLING FOR USING OPERATING BAND COMBINATION

BACKGROUND

Technical Field

The exemplary and non-limiting embodiments relate generally to radio frequency communication and, more particularly, to signaling for using an operating band combination.

Brief Description of Prior Developments

Dual connectivity (DC), carrier aggregation (CA) and LTE-WLAN aggregation are known in regard to radio frequency communication.

SUMMARY

The following summary is merely intended to be exemplary. The summary is not intended to limit the scope of the claims.

In accordance with one aspect, an example method comprises transmitting information from an apparatus regarding at least one operating band combination; selecting by the apparatus either a supported indicator or an unsupported indicator regarding the information; and transmitting the selected indicator by the apparatus.

In accordance with another aspect, an example apparatus comprises at least one processor; and at least one non-transitory memory including computer program code, the at least one memory and the computer program code configured to, with the at least one processor, cause the apparatus to: transmit information from the apparatus regarding at least one operating band combination; select by the apparatus either a supported indicator or an unsupported indicator regarding the information; and transmit the selected indicator by the apparatus.

In accordance with another aspect, an example method comprises receiving by an apparatus information from a device regarding at least one operating band combination; receiving by the apparatus an indicator, where the indicator comprises either a supported indicator or an unsupported indicator; and interpreting the information, based upon the indicator, as the device either supporting the information regarding the at least one operating band combination or not supporting the information regarding the at least one operating band combination.

In accordance with another aspect, an example apparatus comprises at least one processor; and at least one non-transitory memory including computer program code, the at least one memory and the computer program code configured to, with the at least one processor, cause the apparatus to: receive by the apparatus information from a device regarding at least one operating band combination; receive by the apparatus an indicator, where the indicator comprises either a supported indicator or an unsupported indicator; and interpret the information, based upon the indicator, as the device either supporting the information regarding the at least one operating band combination or not supporting the information regarding the at least one operating band combination.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
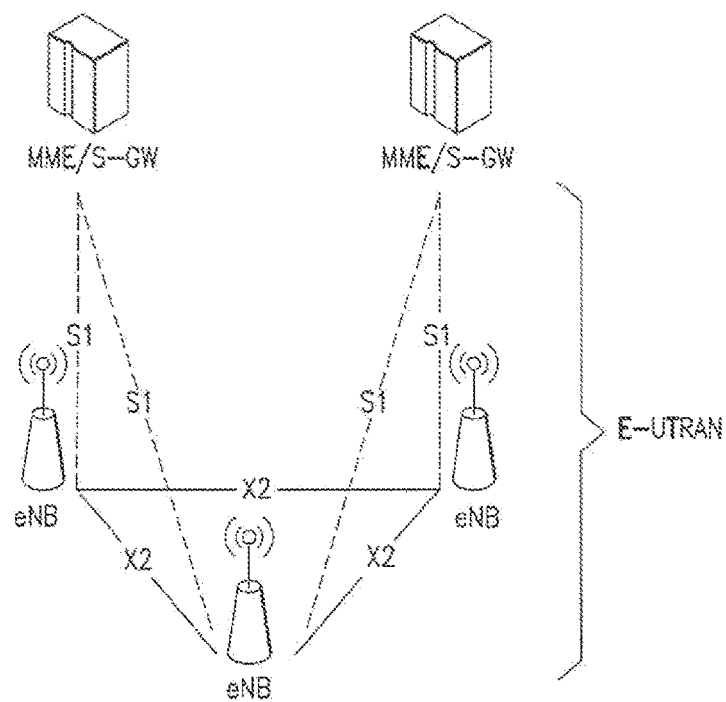
FIG. 1 is a diagram illustrating an example of an overall architecture of a E-UTRAN (evolved UMTS Terrestrial Radio Access) system (an air interface of 3GPP's Long Term Evolution (LTE) upgrade path for mobile networks)

The following abbreviations that may be found in the specification and/or the drawing figures are defined as follows:

3GPP Third Generation Partnership Program
BS Base Station
CA Carrier Aggregation
CC Component Carrier
CSI Channel State Information
CSI-RS Channel State Information Reference Signal
DC Dual Connectivity
DL Downlink
eIMTA Enhanced Interference Mitigation and Traffic Adaptation (the name of the 3GPP WI targeting to flexible UL/DL adaptation for TD-LTE)
eNB/eNodeB enhanced Node B (base station according to LTE terminology)
EPC Enhanced Packet Core
ETSI European Telecommunications Standards Institute
E-UTRAN Evolved Universal Terrestrial Radio Access Network
FDD Frequency Division Duplex
HARQ Hybrid Automatic Repeat ReQuest
ID Identity
L1 Layer 1, Physical Layer
LAA License-Assisted Access
LBT Listen Before Talk
LTE Long Term Evolution
LWA LTE-WLAN Aggregation
MIMO Multiple Input Multiple Output
NAICS Network Assisted Interference Cancellation and Suppression
OFDM Orthogonal Frequency Division Multiplexing
OFDMA Orthogonal Frequency Division Multiple Access
PCell Primary Cell
PDCCH Physical Downlink Control CHannel
PDSCH Physical Downlink Shared CHannel
PLMN Public Land Mobile Network
PMCH Physical Multicast Channel
PUCCH Physical Uplink Control Channel
PUSCH Physical Uplink Shared Channel
PRB Physical Resource Block
PSS Primary Synchronization Signal
RAN Radio Access Network
Rel Release
RNTI Radio Network Temporary Identifier
RRM Radio Resource Management
SCell Secondary Cell
SDL Supplemental DL
TD/TDD Time Division duplex
UCI Uplink Control Information
UE User Equipment UL Uplink WLAN Wireless Local Area Network X2 X2 is an interface used to communication between eNBs FIG. 1 shows an example of overall architecture of an E-UTRAN system. The E-UTRAN system includes eNBs, providing an E-UTRAN user plane (PDCP/RLC/MAC/PHY) and control plane (RRC) protocol terminations towards the UE (not shown in FIG. 1). The eNBs are interconnected with each other by means of an X2 interface. The eNBs are also connected by means of a S1 interface to an EPC (Enhanced Packet Core), more specifically to a MME (Mobility Management Entity) by means of a S1 MME interface and to a Serving Gateway (S-GW) by means of a S1 interface. The S1 interface supports a many-to-many relationship between MMEs/S-GW and eNBs.

Figure 2:
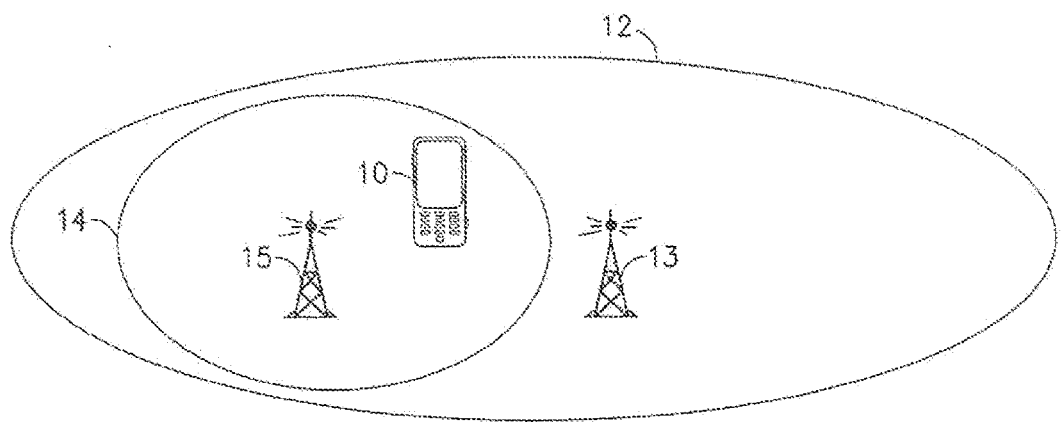
FIG. 2 is a diagram illustrating an example of a User Equipment (UE) in partially overlapping cells.

Referring also to FIG. 2, a UE 10 may be connected to more than one cell at a same time. In this example the UE 10 is connected to a first cell 12 operated by a base station 13 (such as an eNB for example) and a second 14 operated by another base station 15 (such as an eNB or WiFi Access Point for example). The two cells 12, 14 are, thus, at least partially overlapping. The first cell may operate on a licensed band and the second cell may operate on a licensed or unlicensed band for example. The first cell may be either a FDD cell or TDD cell for example. For simplicity, there are just two cells depicted in the scenario for the UE 10 shown in FIG. 2. In other alternate examples any number of cells operating on licensed and/or unlicensed band(s) may be provided to work together for a suitable Carrier Aggregation (CA) and/or Dual Connectivity (DC) and/or aggregation of LTE and agnother RAT (for example LTE-WLAN aggregation (LWA)), and/or any other suitable type of radio access technology (RAT) aggregation. In one type of example embodiment the cells 12, 14 may be co-located. In another type of example embodiment the two base stations 13 and 15 may be co-located and/or consist of one base station only.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Features as described herein may be used in relation to an LTE-Advanced system. More specifically, features as described herein may be used for LTE Carrier Aggregation (CA) operation including the newly developed feature of Licensed-Assisted Access (LAA), where the SCell may be using unlicensed band for communication with the UE. Please note that features as described herein are not specifically for LAA (unlicensed band operation), but for CA and/or DC and/or LTE-other RAT aggregation, and/or any other suitable RAT aggregation operation in general. In one type of example embodiment the carrier aggregation principle may assume LTE Rel-10/11/12/13 Carrier Aggregation scenario with co-located cells and/or non-collocated cells connected with (close to) ideal backhaul. The secondary cell(s) may be used for supplemental downlink capacity only, or both downlink and uplink capacity.

Figure 3:
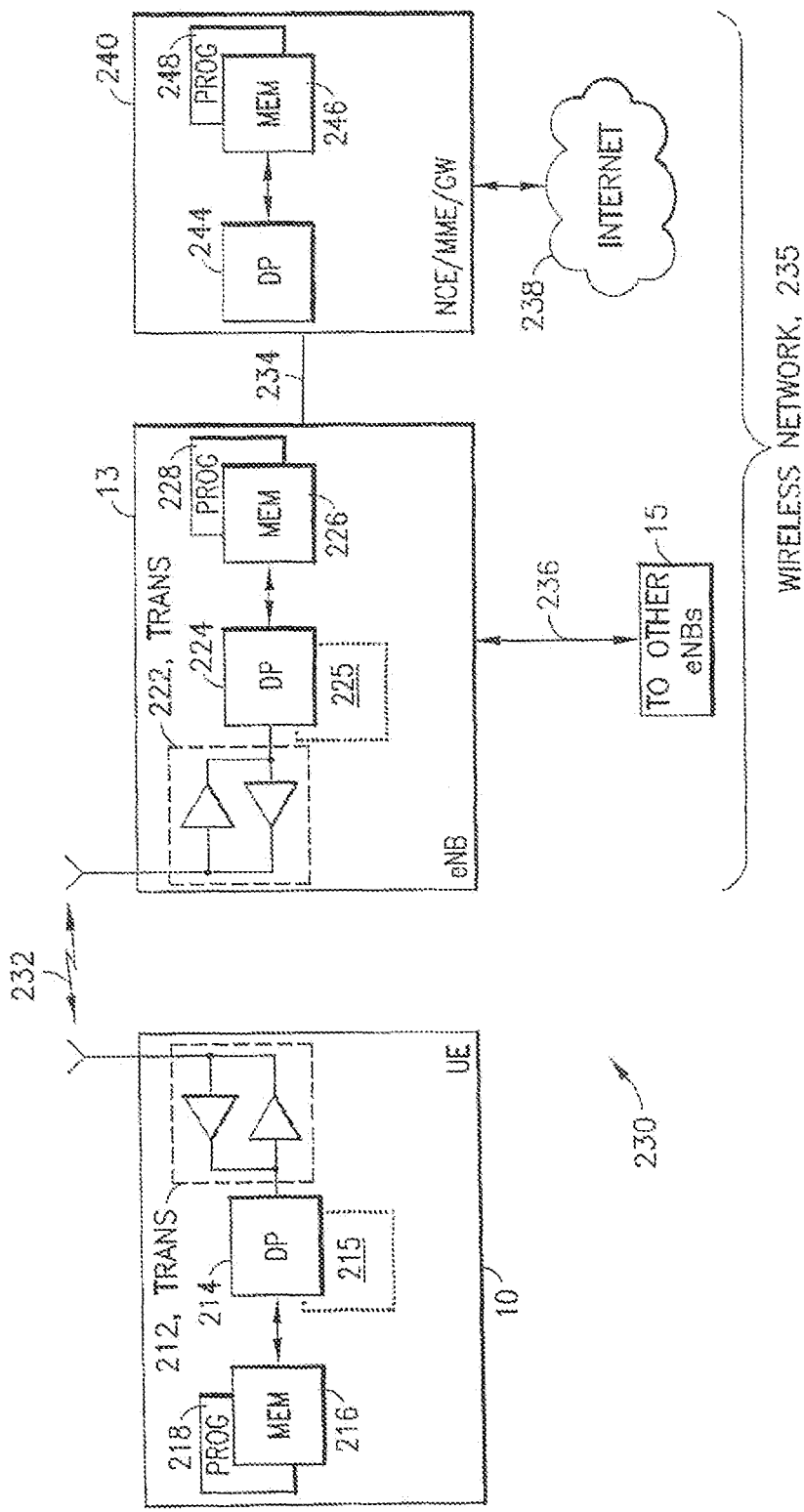
FIG. 3 is a diagram illustrating some components of the wireless system shown in FIGS. 1 and 2.

Referring also to FIG. 3, in the wireless system 230 a wireless network 235 is adapted for communication over a wireless link 232 with an apparatus, such as a mobile communication device which may be referred to as a UE 10, via a network access node, such as a Node B (base station), and more specifically an eNB 13. The network 235 may include a network control element (NCE) 240 that may include MME/S-GW functionality, and which provides connectivity with a network, such as a telephone network and/or a data communications network (e.g., the internet 238).

The UE 10 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 13 via one or more antennas.

The eNB 13 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 10 via one or more antennas. The eNB 13 is coupled via a data/control path 234 to the NCE 240. The path 234 may be implemented as an interface. The eNB 13 may also be coupled to another eNB via data/control path 236, which may be implemented as an interface.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UE 10; by the DP 224 of the eNB 13; and/or by the DP 244 of the NCE 240, or by hardware, or by a combination of software and hardware (and firmware). Base station 15 may have the same type of components as the base station 13.

For the purposes of describing various exemplary embodiments in accordance with this invention the UE 10 and the eNB 13 may also include dedicated processors, for example RRC module 215 and a corresponding RRC module 225. RRC module 215 and RRC module 225 may be constructed so as to operate in accordance with various exemplary embodiments in accordance with this invention.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

3GPP specified the carrier aggregation framework in Rel-10 with the possibility for aggregating up to five (5) component carriers for a single UE. The aim was to increase the peak throughput for UEs as well as the flexibility of spectrum utilization. Recently, in Rel-13 CA enhancements work seeks to increase the number of carriers that can be aggregated to a single UE from five (5) to up to thirty-two (32) component carriers.

Conventionally, a UE always indicates its capabilities to the network so that the network knows what can be configured for the UE. These include the supported operating band combinations for carrier aggregation and the corresponding parameters (e.g. number of supported MIMO layers or CSI processes, need for measurement gaps when measuring certain bands, support of NAICS, etc.). With the increase of possible supported band combinations noted above, and band combination-dependent capabilities, the size of the UE capability indications will be increasing rapidly. Thus, UE capability signaling is becoming a communications bottleneck. For example, a UE may support more band combinations that is possible to fit within the conventional capability signaling. Rel-11 RAN2 agreed to increase the amount of possible band combinations that can be signaled by the UE, and in addition introduced a feature of "Network-requested band combination capabilities" to Rel-11, wherein the network requests UE to inform it of the band combination capabilities only related to the frequency bands indicated by network. The former allows UE to indicate more capabilities, and the latter allows operation with legacy (Rel-10) eNBs who do not understand the new signaling. The feature also allows reducing the signaling size by limiting the information UE indicates to only those band combinations that contain bands that are relevant to the eNB.

The current CA capability signaling was originally designed in Rel-10 to be very flexible and allow UE to signal many different kinds of combinations of capabilities. However, with the addition of new bands and ever-increasing amount of CA band combinations, the structure and size of the capability signaling will eventually become a bottleneck. Further, the new additions are making the capability signaling grow in size with every release. With up to 32 CCs being standardized, even the extended amount of band combination capabilities seems to become a limiting factor. For example, with 32 supported bands, there are 496 possible 2DL band combinations. As another example, even with assuming 6DL band combinations as baseline, a UE supporting 20 frequency bands could support 38,760 6DL inter-band combinations based on those. This is clearly too large a number for current signaling. Features as described herein may be used to allow a UE to indicate its capabilities without an excessively large signaling size; even for a 32 CC situation or a situation having more than 32 CC.

Features as described herein may have a UE indicates a list of operating bands with a flag for indicating how the list is to be interpreted: positively (supported capabilities) or negatively (not supported capabilities). The list may refer to the indexes of band combination tables in 3GPP TS 36.101 for example. The operating band combination entries may only indicate for which bands CA or DC is supported, and the eNB can request the UE to indicate the remaining capabilities using the same indexes (e.g. MIMO capability, CSI process, NAICS capabilities, etc.) for the combinations it intends to configure CA or DC.

The following table is a portion of Table 5.5A-2a: Inter-band CA operating bands (three bands) from 3GPP TS 36.101 Rel. 13, merely shown here as an example of possible table information:

| E-UTRA CA Band | E-UTRA Band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
|---|---|---|---|---|
| CA_1-3-5 | 1 | 1920 MHz-1980 MHz | 2110 MHz-2170 MHz | FDD |
|  | 3 | 1710 MHz-1785 MHz | 1805 MHz-1880 MHz |  |
|  | 5 | 824 MHz-849 MHz | 869 MHz-894 MHz |  |
| CA_1-3-8 | 1 | 1920 MHz-1980 MHz | 2110 MHz-2170 MHz | FDD |
|  | 3 | 1710 MHz-1785 MHz | 1805 MHz-1880 MHz |  |
|  | 8 | 880 MHz-915 MHz | 925 MHz-960 MHz |  |
| CA_1-3-19 | 1 | 1920 MHz-1980 MHz | 2110 MHz-2170 MHz | FDD |
|  | 3 | 1710 MHz-1785 MHz | 1805 MHz-1880 MHz |  |
|  | 19 | 830 MHz-845 MHz | 875 MHz-890 MHz |  |
| CA_1-3-20 | 1 | 1920 MHz-1980 MHz | 2110 MHz-2170 MHz | FDD |
|  | 3 | 1710 MHz-1785 MHz | 1805 MHz-1880 MHz |  |
|  | 20 | 832 MHz-862 MHz | 791 MHz-821 MHz |  |
| CA_1-3-26 | 1 | 1920 MHz-1980 MHz | 2110 MHz-2170 MHz | FDD |
|  | 3 | 1710 MHz-1785 MHz | 1805 MHz-1880 MHz |  |
|  | 26 | 814 MHz-849 MHz | 859 MHz-894 MHz |  |
| CA_1-3-28 | 1 | 1920 MHz-1980 MHz | 2110 MHz-2170 MHz | FDD |
|  | 3 | 1710 MHz-1785 MHz | 1805 MHz-1880 MHz |  |
|  | 28 | 703 MHz-748 MHz | 758 MHz-803 MHz |  |
| CA_1-3-42 | 1 | 1920 MHz-1980 MHz | 2110 MHz-2170 MHz | FDD |
|  | 3 | 1710 MHz-1785 MHz | 1805 MHz-1880 MHz |  |
|  | 42 | 3400 MHz-3600 MHz | 3400 MHz-3600 MHz | TDD |

3GPP TS 36.101 contains numerous other tables with operating band combination information and capabilities information. When transmitted by the UE, this information(s) is referred to herein as information from an apparatus regarding at least one operating band combination.

Several different alternatives are envisioned.

In a first example, the operating band combination tables for CA and DC are accurately maintained in both the UE and the network to guarantee unique indexes of the operating band combinations and capabilities. In one example, the index can be an explicit indication regarding a table in 36.101, and the index may point to a specific row of that table. As an alternative, a simple index may be maintained in regard to throughout 3GPP TS 36.101. In an alternative example, instead of a list of operating band combinations, there could be a bitmap with "1" and "0" pointing to which of the operating band combinations in 3GPP TS 36.101 is supported by the UE and which of the operating band combinations in 3GPP TS 36.101 is not supported by the UE, respectively. In some cases, this bitmap approach could reduce the size of the signaling significantly.

In the future, when adding an additional operating band combination for CA and/or DC in the tables, it may be either added at the end (always to allow for implicit indexes such as with the first index corresponding to the first entry, the second one to the second entry . . . , etc.) and/or a new column may be added with explicit indexes used (for example with potentially explicit indices also for different tables since 36.101 has, and will most likely continue to have, different tables for different CA band combinations). Even now there are different tables for 2DL CA and 3DL CA band combinations.

The indications can be either a positive indication (to show that the operating band combination is supported) or a negative indication (to show that the operating band combination is not supported). Selecting between a positive indication or a negative indication may be based upon which type of indication use takes less signaling space. This allows a UE to optimize the signaling to suit its capabilities. For example, if there are 100 possible band combinations in the 3GPP TS 36.101 tables, and the UE is able to support only 40 of those possible band combinations, the UE may use a positive indication to signal support for those forty possible operating band combinations. As another example, if there are 100 possible band combinations in the 3GPP TS 36.101 tables, and the UE is able to support only 60 of those possible band combinations, the UE may use a negative indication to signal it does not support the forty other possible operating band combinations, thereby implicitly signaling that it does support the other 60 possible operating band combinations. Thus, for the operating bands, in case the UE supports most of the operating band combinations defined in the tables, it can use negative indications to signal the operating band combinations it does not support. Conversely, if the UE only supports a few of the operating band combinations defined in the tables, it can then use positive indications to signal those band combinations. However, features as described herein are not limited to indicating operating bands or band combinations supported by the UE. Features as used herein may be used to indicate capabilities supported on each operating band combination.

In one example, for the capabilities supported on each operating band combination, in case the UE supports similar capabilities for most, it can use negative indications to show what it does not support instead of what it does support. Conversely, if the UE supports varied capabilities depending on band combination (for example, due to different interoperability test (IOT) opportunities), positive capabilities allow UE to indicate exactly what it supports.

In one example the UE may indicate to the eNB that it uses positive capability indications. The UE, in the capability list indexes, also may indicate referring to CA band combinations 1A_2A, 1C and 2C. Based upon these two indications, the eNB may interpret that the UE only supports CA with those band combinations: 1A_2A, 1C and 2C.

In another example, the UE may indicate to the eNB it uses negative capability indications. The UE may also indicate a maximum number of CCs being 2 for DL and 1 for UL, and then indicates in the capability list indexes referring to CA combinations 1A_2A, 1C and 2C. The eNB may interpret this information that the UE does not support CA with those band combinations (1A_2A, 1C and 2C), but does support CA with any other 2DL and 1UL combinations of the frequency bands which the UE supports.

In another example, the operating band combinations, and/or the band combination-specific capabilities, may be indicated separately in a table common to all operating bands. Alternatively, these may be queried separately by eNB. The positive or negative indication can then allow the UE to indicate which options it supports.

For example, the UE may indicate that for all 2CC CA/DC band combinations, the UE supports 4-layer MIMO, and for all 3CC CA/DC band combinations, it only supports 2-layer MIMO. As another example, using negative indications, a baseline can be used similar to that described above. This could be either an explicit maximum supported CSI/MIMO capability, or a bitmap referring to a static table for example.

In another example, requested capabilities may be used to obtain the full UE capabilities. This allows for compression of UE capabilities, with only relevant UE capabilities included. For example, when the UE indicates initially merely indicates supported CA/DC operating band combinations without indicating any other capabilities, The eNB may then query the UE with regard to the exact UE parameters before configuring a CA or DC operation.

In another example, a UE may indicate support for a 3 CC band combination. This indication may also automatically be interpreted by the eNB to indicate that the UE supports the "fallback" combinations. For example, with a 3CC band combination indicated, the eNB may consider the UE to support cases with less than 3 CCs that can be derived from the original 3CC combination without changing the type from contiguous to non-contiguous CA. Hence, in one example the UE might only indicate the maximal supported CC combinations, and the fallback cases may be understood by the eNB to be implicitly supported by the UE. For example, if the UE indicates it supports a 4CC DL band combination 41C_42C. The fallback combinations for this case are 41C_42A, 41C, 41A_42A, 42A_42C and 42C. The UE indicating only 41C_42C may be automatically understood to support the fallback cases with at least the same parameters as for the original combination.

Figure 4:
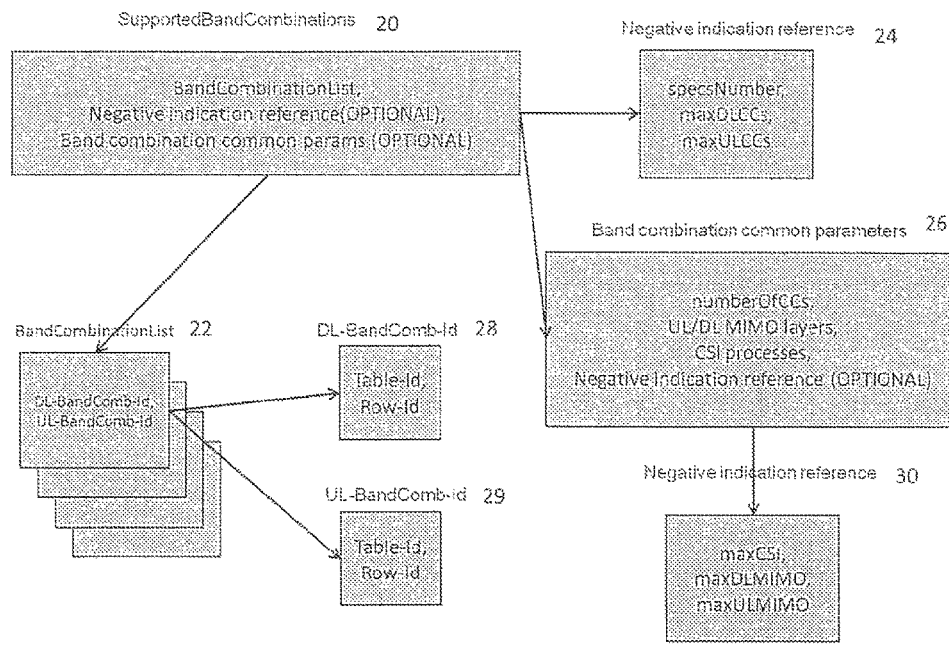
FIG. 4 is a diagram illustrating an example of capability signaling.

FIG. 4 illustrates an example of the capability signaling. In this example block 20 indicates that a supported band combinations may comprise a band combination list 22 with an optional negative indication reference 24, and an optional indication of band combination common parameters 26. The band combination list 22 may include a DL-BandComb-Id and an UL-BandComb-Id for each combination where each DL-BandComb-Id 28 and each UL-BandComb-Id 29 has a Table-Id and Row-Id referencing to 3GPP TS 36.101. The optional negative indication reference 24 may include specsNumber, maximum DL CCs and maximum UL CCs for example. The optional indication of band combination common parameters 26 may include number of CCs, UL/DL MIMO layers, CSI processes, and optional negative indication reference(s) 30. The optional negative indication reference(s) 30 regarding the band combination common parameters may comprise negative indication reference to maximum CSI, maximum DL MIMO, and maximum UL MIMO for example.

An Abstract Syntax Notation One (ASN.1) example for how the FIG. 4 can be realized is also shown below:

```
-- ASN1START
RF-Parameters-r13 ::=                    SEQUENCE {
    supportedBandCombinations-r13        SupportedBandCombinations-r13,
        OPTIONAL
    -- List of Rel-13 band combinations
    negativeCapabilities-r13             NegativeCapabilities-r13     OPTIONAL
    -- If included, capabilities indicate what UE does NOT support.
    bandCombSpecificParams-r13           BandComb SpecificParams-r13
        OPTIONAL
    -- If included, indicates supported UL/DL MIMO layers and CSI processes
}
BandComb SpecificParams-r13 ::= SEQUENCE (1..maxSimultaneousBands) OF
BandSpecificParams-r13
BandSpecificParams-r13 ::= SEQUENCE {
    numberOfCCs                          INTEGER (1..maxSimultaneousBands),
    -- Number of CCs for the indication
    downlinkMIMO-r13                     supportedMIMO-CapabilityDL-r13
        OPTIONAL,
    -- DL MIMO layers common to all bands in the band combination
    uplinkMIMO-r13                       supportedMIMO-CapabilityUL-r13
        OPTIONAL,
    -- UL MIMO layers common to all bands in the band combination
    supportedCSI-Proc-r13                ENUMERATED {n1, n3, n4}
        OPTIONAL,
    -- Number of CSI processes common to all bands in the band combination
    negativeCapabilities-r13             NegativeBandCombCapabilities-r13
        OPTIONAL
    -- If included, capabilities indicate what UE does NOT support
}
NegativeBandCombCapabilities-r13 ::=     SEQUENCE {
    maxSupportedCSI-Proc-r13             ENUMERATED {n1, n3, n4}
        OPTIONAL,
    maxMIMOLayers-DL-r13                 supportedMIMO-capabilityDL-r13
        OPTIONAL,
    maxMIMOLayers-UL-r13                 supportedMIMO-CapabilityUL-r13
        OPTIONAL
    -- Maximum supported capabilities
}
NegativeCapabilities-r13 ::=SEQUENCE {
    specNumber                OCTET STRING (1..16),
    -- 36.101 Specification number of the UE
    maxNumberOfCCs            SEQUENCE {
        downlink              INTEGER (1..maxSimultaneousBands-r13),
        uplink                INTEGER (1..maxSimultaneousBands-r13)
    }  OPTIONAL
    -- Maximum supported CA capability for the UE, if it's not provided, the full spec
is supported
}
SupportedBandCombinations-r13 ::=SEQUENCE (SIZE (maxBandComb-r13)) OF
AggregatedBandList-r13
-- One list for each N CC band combinations
AggregatedBandList-r13 ::=        SEQUENCE {
    dlBandCombinationId-r13           DL-BandCombIndex-r13, -- DL band
combination index in 36.101
    -- Points the index for table in 36.101
    ulBandCombinationId-r13           UL-BandCombIndex-r13
        OPTIONAL
    -- UL band combination index is optional,absence means UL CA is NOT
supported
}
DL-BandCombIndex-r13 ::= SEQUENCE {
    tableIndex             INTEGER (1..maxBandCombTables-r13),  -- Table index
in 36.101
    rowIndex               INTEGER (1..maxBandComb-r13)         -- Row index in
table of 36.101
}
UL-BandCombIndex-r13 ::= SEQUENCE {
    tableIndex             INTEGER (1..maxBandCombTables-r13),  -- Table index
in 36.101
    rowIndex               INTEGER (1..maxBandComb-r13)         -- Row index in
table of 36.101
}
-- ASN1STOP
```

Figure 5:
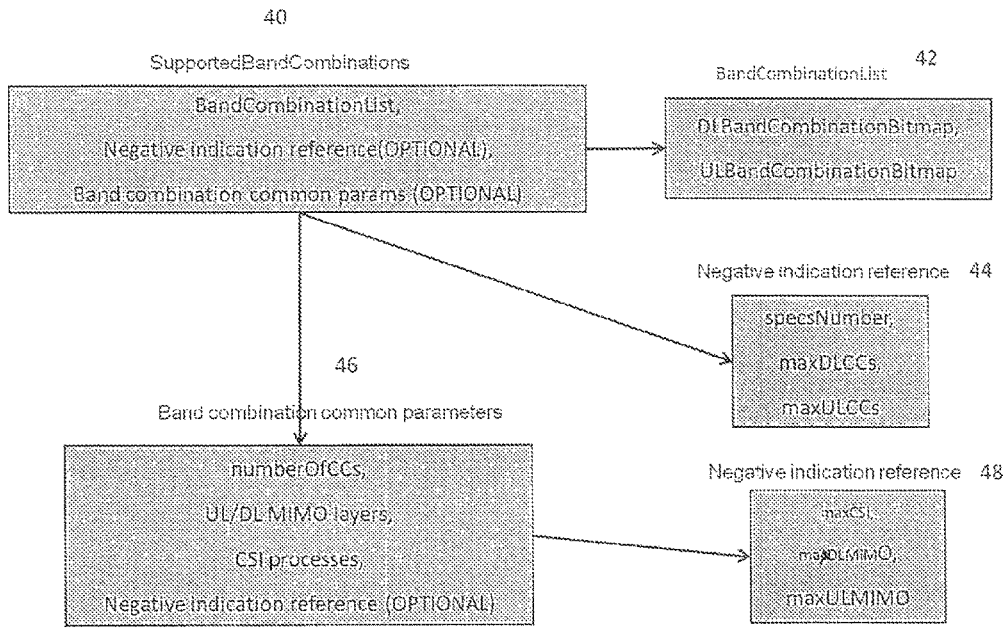
FIG. 5 is a diagram illustrating another example of capability signaling.

Alternatively, if a bitmap is used to refer to indexes in 36.101, FIG. 5 shows an example capability structure. In this example block 40 indicates that a supported band combinations may comprise a band combination list 42 with an optional negative indication reference 44, and an optional indication of band combination common parameters 46. The band combination list may comprise a DL band combination bitmap and a UL band combination bitmap, both regarding band combinations listed in the most current version of 3GPP TS 36.101. The optional negative indication reference

44 may include "specsNumber" (i.e. the version number of the 36.101 specification that the UE supports, e.g. "v10.10.0"), maximum number of supported DL CCs for CA and maximum number of supported UL CCs for CA for example. The optional indication of band combination common parameters 46 may include number of CCs, UL/DL MIMO layers, CSI processes, and optional negative indication reference(s) 48. The optional negative indication reference(s) 48 regarding the band combination common parameters may comprise negative indication reference to maximum CSI, maximum DL MIMO, and maximum UL MIMO for example.

For this alternative, and ASN.1 example may comprise:

```
-- ASN1START
RF-Parameters-r13 ::=                     SEQUENCE {
    supportedBandCombinations-r13         SupportedBandCombinations-r13,
    OPTIONAL
    -- List of Rel-13 band combinations
    negativeCapabilities-r13              NegativeCapabilities-r13
    OPTIONAL,
    -- If included, capabilities indicate what UE does NOT support.
    bandCombSpecificParams-r13            BandCombSpecificParams-r13
        OPTIONAL
    -- If included, indicates supported UL/DL MIMO layers and CSI processes
}
BandCombSpecificParams-r13 ::= SEQUENCE (1..maxSimultaneousBands) OF
BandSpecificParams-r13
BandSpecificParams-r13 ::= SEQUENCE {
    numberOfCCs                           INTEGER (1..maxSimultaneousBands),
    -- Number of CCs for the indication
    downlinkMIMO-r13                      supportedMIMO-CapabilityDL-r13
    OPTIONAL,
    -- DL MEMO layers common to all bands in the band combination
    uplinkMIMO/r13                        supportedMIMO-CapabilityUL-r13
    OPTIONAL,
    -- UL MIMO layers common to all bands in the band combination
    supportedCSI-Proc-r13        ENUMERATED {n1, n3, n4}
    OPTIONAL,
    -- Number of CSI processes common to all bands in the band combination
    negativeCapabilities-r13              NegativeBandCombCapabilities-r13
    OPTIONAL
    -- If included, capabilities indicate what UE does NOT support
}
NegativeBandCombCapabilities-r13 ::=  SEQUENCE {
    maxMIMOLayers-DL-r13                  supportedMIMO-CapabilityDL-r13
    OPTIONAL,
    maxMIMOLayers-UL-r13                  supportedMIMO-CapabilityUL-r13
    OPTIONAL,
    maxSupportedCSI-Proc-r13   ENUMERATED {n1, n3, n4}
    OPTIONAL
    -- Maximum supported capabilities
}
NegativeCapabilities-r13 ::= SEQUENCE {
    specNumber                   OCTET STRING (1..16),
    -- 36.101 Specification number of the UE
    maxNumberOfCCs               SEQUENCE {
        downlink                 INTEGER (1..maxSimultaneousBands-r13),
        uplink                   INTEGER (1..maxSimultaneousBands-r13)
    }  OPTIONAL
    -- Maximum supported CA capability for the UE, if it's not provided, the full spec
is supported
}
SupportedBandCombinations-r13 ::= SEQUENCE {
    dlBandCombinationId-r13            BIT STRING
(SIZE(maxDLBandCombTableSize-r13)),
    -- Bitmap referring to DL band combination index in 36.101
    dlBandCombinationId-r13            BIT STRING
(SIZE(maxDLBandCombTableSize-r13))  OPTIONAL
    -- Bitmap referring to UL band combination index in 36.101, absence means no
UL CA support
}
-- ASN1STOP
```

Figure 6:
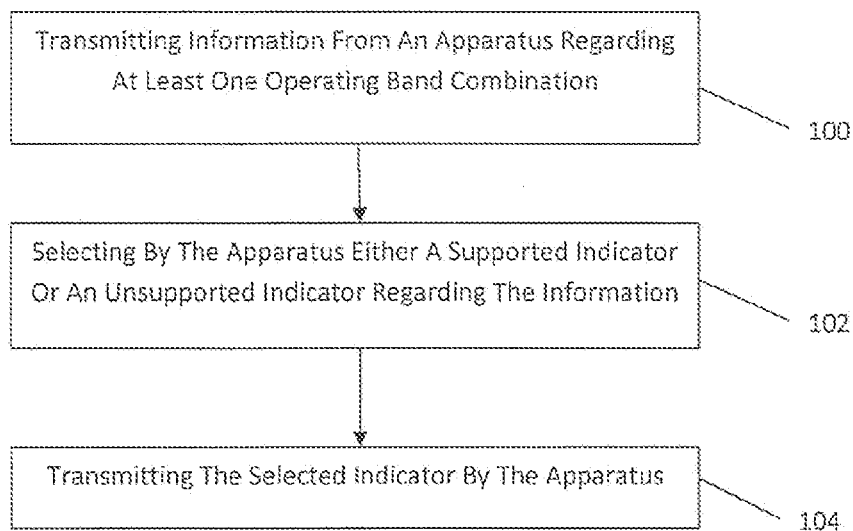
FIG. 6 is a diagram illustrating an example method.

Referring also to FIG. 6, an example method may comprise transmitting information from an apparatus regarding at least one operating band combination as indicated by block 100; selecting by the apparatus either a supported indicator or an unsupported indicator regarding the information as indicated by block 102; and transmitting the selected indicator by the apparatus as indicated by block 104. Please note that the order of steps illustrated by this example may be varied. For example, the apparatus may first select the indicator, transmit the indicator, and then transmit the information regarding the at least one operating band combination.

The information regarding at least one operating band combination may comprise at least one of: an index comprising a plurality of operating band combinations; and a bitmap relating to the index of operating band combinations. The information regarding at least one operating band combination may comprise capabilities regarding respective bands in the at least one operating band combination. The method may further comprise transmitting an indication regarding carrier aggregation (CA) and/or dual connectivity (DC) and/or LTE-WLAN Aggregation (LWA) operating band combinations for at least one number of component carriers (CC), and where the information regarding the at least one operating band combination comprises capability information regarding the carrier aggregation (CA) and/or dual connectivity (DC) and/or LTE-WLAN Aggregation (LWA) operating band combinations for the at least one number of component carrier (CC). The method may further comprise, after transmitting the information and the selected indicator, receiving by the apparatus a request for capability information regarding a selected one of the at least one operating band combination; and transmitting from the apparatus capability information for the apparatus regarding respective bands of the selected operating band combination. The method may further comprise, before transmitting the information and the selected indicator, transmitting by the apparatus a maximal supported component carrier (CC) band combination. The method may further comprise transmitting by the apparatus carrier aggregation (CA) and/or dual connectivity (DC) and/or LTE-WLAN Aggregation (LWA) operating band combinations supported by the apparatus, and receiving by the apparatus a request for the information and selected indicator regarding at least one of the supported carrier aggregation (CA) and/or dual connectivity (DC) and/or LTE-WLAN Aggregation (LWA) operating band combinations. Selecting by the apparatus either a supported indicator or an unsupported indicator regarding the information may comprise determining at least one of a size of an indication of supported capabilities from a set of capabilities and a size of an indication of unsupported capabilities from the set of capabilities, and then selecting the smaller one of the sizes.

An embodiment may be provide in an apparatus such as 10 for example, comprising at least one processor; and at least one non-transitory memory including computer program code, the at least one memory and the computer program code configured to, with the at least one processor, cause the apparatus to: transmit information from the apparatus regarding at least one operating band combination; select by the apparatus either a supported indicator or an unsupported indicator regarding the information; and transmit the selected indicator by the apparatus.

The information regarding the at least one operating band combination may comprise at least one of: an index comprising a plurality of operating band combinations; and a bitmap relating to the index of operating band combinations. The information regarding the at least one operating band combination may comprise capabilities regarding respective bands in the at least one operating band combination. The at least one memory and the computer program code may be configured to, with the at least one processor, cause the apparatus to transmit an indication regarding carrier aggregation (CA) and/or dual connectivity (DC) and/or LTE-WLAN Aggregation (LWA) operating band combinations for at least one number of component carriers (CC), and where the information regarding the at least one operating band combination comprises capability information regarding the carrier aggregation (CA) and/or dual connectivity (DC) and/or LTE-WLAN Aggregation (LWA) operating band combinations for the at least one number of component carrier (CC). The at least one memory and the computer program code are configured to, with the at least one processor, cause the apparatus to: after transmitting the information and the selected indicator, receive by the apparatus a request for capability information regarding a selected one of the at least one operating band combination; and transmit from the apparatus capability information for the apparatus regarding respective bands of the selected operating band combination. The at least one memory and the computer program code may be configured to, with the at least one processor, cause the apparatus to, before transmitting the information and the selected indicator, transmit by the apparatus a maximal supported component carrier (CC) band combination. The at least one memory and the computer program code may be configured to, with the at least one processor, cause the apparatus to transmit by the apparatus carrier aggregation (CA) and/or dual connectivity (DC) and/or LTE-WLAN Aggregation (LWA) operating band combinations supported by the apparatus, and receiving by the apparatus a request for the information and selected indicator regarding at least one of the supported carrier aggregation (CA) and/or dual connectivity (DC) and/or LTE-WLAN Aggregation (LWA) operating band combinations.

An example embodiment may be provided in a non-transitory program storage device such as 216 for example readable by a machine, tangibly embodying a program of instructions executable by the machine for performing operations, the operations comprising: transmitting information from an apparatus regarding at least one operating band combination; selecting by the apparatus either a supported indicator or an unsupported indicator regarding the information; and transmitting the selected indicator by the apparatus.

An example embodiment may comprise means for transmitting information from an apparatus regarding at least one operating band combination as indicated by block 100; means for selecting by the apparatus either a supported indicator or an unsupported indicator regarding the information as indicated by block 102; and means for transmitting the selected indicator by the apparatus as indicated by block 104.

Figure 7:
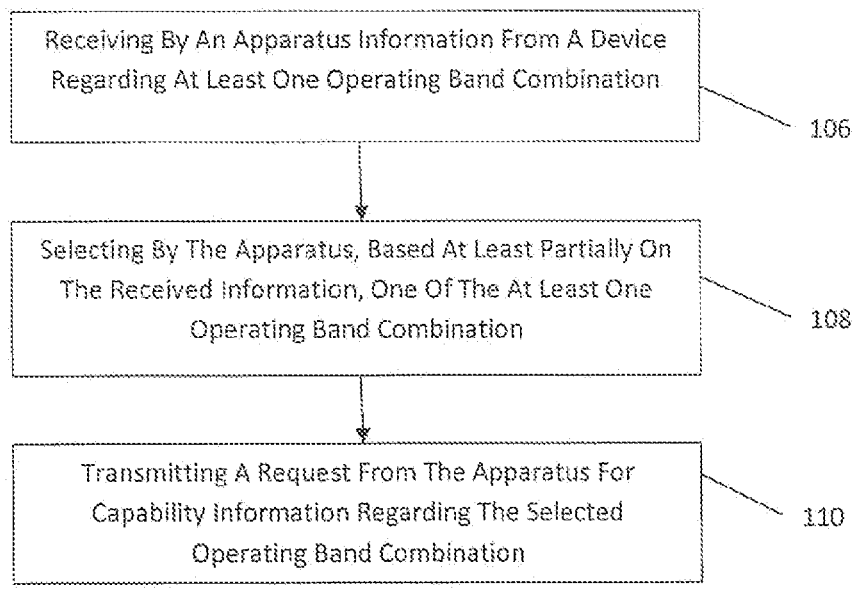
FIG. 7 is a diagram illustrating an example method.

Referring also to FIG. 7, an example method may comprise receiving by an apparatus, such as 13 for example, information from a device regarding at least one operating band combination as indicated by block 106; selecting by the apparatus, based at least partially on the received information, one of the at least one operating band combination as indicated by block 108; and transmitting a request from the apparatus for capability information regarding the selected operating band combination as indicated by block 110.

The information received by the apparatus may comprise either a supported indicator or an unsupported indicator regarding the at least one operating band combination. The information received by the apparatus may comprise at least one of: an index comprising a plurality of operating band combinations; and a bitmap relating to the index of operating band combinations.

An example apparatus, such as 13 for example, may comprise at least one processor; and at least one non-transitory memory including computer program code, the at least one memory and the computer program code configured to, with the at least one processor, cause the apparatus to: receive by the apparatus information from a device regarding at least one operating band combination; select by the apparatus, based at least partially on the received information, one of the at least one operating band combination; and transmit a request from the apparatus for capability information regarding the selected operating band combination.

The information received by the apparatus may comprise either a supported indicator or an unsupported indicator regarding the at least one operating band combination. The information received by the apparatus may comprise at least one of: an index comprising a plurality of operating band combinations; and a bitmap relating to the index of operating band combinations.

An example embodiment may comprise means for receiving by an apparatus, such as 13 for example, information from a device regarding at least one operating band combination as indicated by block 106; means for selecting by the apparatus, based at least partially on the received information, one of the at least one operating band combination as indicated by block 108; and means for transmitting a request from the apparatus for capability information regarding the selected operating band combination as indicated by block 110.

An example apparatus may comprise a non-transitory program storage device, such as 226 for example, readable by a machine, tangibly embodying a program of instructions executable by the machine for performing operations, the operations comprising: receiving by an apparatus information from a device regarding at least one operating band combination; selecting by the apparatus, based at least partially on the received information, one of the at least one operating band combination; and transmitting a request from the apparatus for capability information regarding the selected operating band combination.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

An example method may comprise receiving by an apparatus information from a device regarding at least one operating band combination; receiving by the apparatus an indicator, where the indicator comprises either a supported indicator or an unsupported indicator; and interpreting the information, based upon the indicator, as the device either supporting the information regarding the at least one operating band combination or not supporting the information regarding the at least one operating band combination. Please note that the order of steps illustrated by this example may be varied. For example, the method may comprise first receiving by the apparatus an indicator, where the indicator comprises either a supported indicator or an unsupported indicator; then receiving by the apparatus information from the device regarding at least one operating band combination; and then interpreting the information, based upon the indicator, as the device either supporting the information regarding the at least one operating band combination or not supporting the information regarding the at least one operating band combination.

An example apparatus may comprise at least one processor; and at least one non-transitory memory including computer program code, the at least one memory and the computer program code configured to, with the at least one processor, cause the apparatus to: receive by the apparatus information from a device regarding at least one operating band combination; receive by the apparatus an indicator, where the indicator comprises either a supported indicator or an unsupported indicator; and interpret the information, based upon the indicator, as the device either supporting the information regarding the at least one operating band combination or not supporting the information regarding the at least one operating band combination.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

Figure 8:
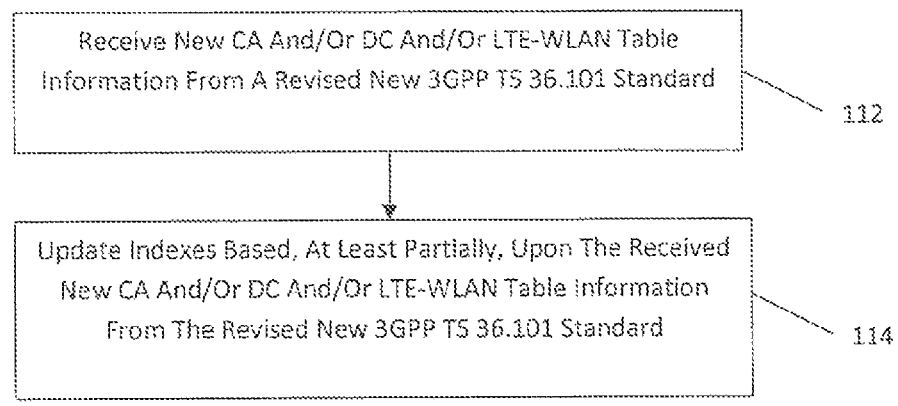
FIG. 8 is a diagram illustrating an example method.

As described above, in one example the operating band combination tables for CA and DC are accurately maintained in both the UE and the network to guarantee unique indexes of the operating band combinations and capabilities. When a new version of 3GPP TS 36.101 is approved, an update regarding the operating band combinations and capabilities for revised or new tables in 3GPP TS 36.101 may be uploaded to the UE and/or the network. For example, as shown in FIG. 8, the UE and/or eNB may receive new CA and/or DC table information from the revised new 3GPP TS 36.101 standard as indicated in block 112 and update the indexes as indicated by block 114.

It should be noted that features as described herein are not limited to updating the indexes in the UE. The UE may, instead, signal to the eNB which version of 3GPP TS 36.101 its indexes related to; such as Rel. 12 or Rel. 13 for example. The network may have table information for multiple versions of 3GPP TS 36.101 to refer to in order to correctly interpret the information sent by the UE.

Another example may comprise a method and apparatus where either a negative (unsupported) indication is sent by the UE, or supported information regarding the UE is sent but without an additional positive indication (where the positive indication is implied due to the absence of the negative indication). For example, a method may comprise transmitting information from an apparatus regarding at least one operating band combination; selecting by the apparatus an unsupported indicator regarding the information; and transmitting the selected indicator by the apparatus. Another example could comprise the opposite where either a positive (supported) indication is sent by the UE, or unsupported information regarding the UE is sent but without an additional negative indication (where the negative indication is implied due to the absence of the positive indication).

Features as described herein are not limited to use in regard to only signaling operating bands or band combinations which a UE supports or capabilities supported on each operating band or band combination. Features as used herein may be used for signaling any table information from a 3GPP standard, such as tables which will change over time with releases of new adopted versions of the standard. Features as described herein may comprise transmitting information from an apparatus, where the information is mapped or otherwise organized relative to a table in a 3GPP standard; selecting by the apparatus an unsupported indicator regarding the information; and transmitting the selected indicator by the apparatus. Alternatively or additionally, rather than merely transmitting a unsupported or negative indicator with the information, a positive or supported indicator could be transmitted. As noted above, this could be transmitted in a bitmap with 0/1 pointing to which item in the table(s) are unsupported and supported, respectively. For example, in regard to the portion of the Table 5.5A-2a: Inter-band CA operating bands (three bands) noted above, the bitmap might be:

1
1
1
1
0
0
0

Where CA_1-3-5, CA_1-3-8, CA_1-3-19, CA_1-3-20 are indicated as being supported and CA_1-3-26, CA_1-3-28, CA_1-3-42 are indicated as being unsupported. Please note this is merely intended to be a non-limiting suggestive description and should not be considered as limiting. With features as described herein, the tables in 3GPP standards can be used as the basis for configuring signaling for UE supported items, and subsequently interpreting that signaling.

With features as described herein, a simplified capability signaling for carrier aggregation may be provided as following:
1) Either supported capabilities or not supported capabilities may be indicated, depending on which signaling having less size.
2) Band combination entries may only indicate for which bands CA or DC is supported, and the eNB can request the UE to indicate the remaining capabilities using the same indexes (e.g. MIMO capability, CSI process, NAICS capabilities etc) for the combinations it intends to configure CA or DC.
3) Band combination indication: Instead of indicating the exact band indices for each band combinations:
   Alternative 1—an index of the band combination in the band combination list within a table is used to indicate the band combination (e.g. 0-1023, i.e. 10 bits if 1024 combinations in total).
   Alternative 2—bitmap is used to indicate whether a band combination is supported or not (e.g. 1024 bits can indicate 1024 band combinations).

With the design principle of 1), 2) and 3), these features provide a detailed structure for simplified CA capability signaling as following and further provides ASN.1 example to be specified in the standard texts.

It should be understood that the foregoing description is only illustrative. Various alternatives and modifications can be devised by those skilled in the art. For example, features recited in the various dependent claims could be combined with each other in any suitable combination(s). The order of steps in the method claims are not fixed relative to one another unless otherwise indicated. Thus, an order of the steps in the method claims may vary relative to one another, and the method will still fall within the scope of the appended claims. Unless indicated otherwise, steps may also occur, at least partially, at a same time. In addition, features from different embodiments described above could be selectively combined into a new embodiment. Accordingly, the description is intended to embrace all such alternatives, modifications and variances which fall within the scope of the appended claims.

What is claimed is:

1. A method comprising:
   transmitting information from an apparatus regarding at least one operating band combination;
   determining a size of an indication of supported capabilities from a set of capabilities and a size of an indication of unsupported capabilities from the set of capabilities;
   selecting by the apparatus either a supported indicator or an unsupported indicator regarding the information based on the determination of the size of the indication of supported capabilities from the set of capabilities and the size of the indication of unsupported capabilities from the set of capabilities; and
   transmitting the selected indicator by the apparatus.

2. A method as in claim 1 where the information regarding at least one operating band combination comprises at least one of:
   an index comprising a plurality of operating band combinations; and
   a bitmap relating to the index of operating band combinations.

3. The method of claim 2, where the index is an index of the at least one operating band combination in a band combination list within a table that indicates the at least one operating band combination, and the bitmap indicates whether the at least one operating band combination is supported or unsupported.

4. The method of claim 2, where the index includes at least one of:
   Multiple Input Multiple Output (MIMO) capabilities, Channel State Information (CSI) processes, and Network Assisted Interference Cancellation and Suppression (NAICS) capabilities, wherein the index is configurable to be selected by a receiving eNB to request the apparatus to indicate at least one remaining capability using the index.

5. A method as in claim 1 where the information regarding at least one operating band combination comprises capabilities regarding respective bands in the at least one operating band combination.

6. A method as in claim 1 further comprising transmitting an indication regarding carrier aggregation (CA) and/or dual connectivity (DC) and/or LTE-WLAN Aggregation (LWA) operating band combinations for at least one number of component carriers (CC), and where the information regarding the at least one operating band combination comprises capability information regarding the carrier aggregation (CA) and/or dual connectivity (DC) and/or LTE-WLAN Aggregation (LWA) operating band combinations for the at least one number of component carrier (CC).

7. A method as in claim 1 further comprising:
   after transmitting the information and the selected indicator, receiving by the apparatus a request for further capabilities information regarding a selected one of the at least one operating band combination; and transmitting from the apparatus the further capabilities information for the apparatus regarding respective bands of the selected operating band combination.

8. A method as in claim 1 further comprising, before transmitting the information and the selected indicator, transmitting by the apparatus a maximal supported component carrier (CC) band combination.

9. An apparatus comprising:
at least one processor; and
at least one non-transitory memory including computer program code, the at least one memory and the computer program code configured to, with the at least one processor, cause the apparatus to:
transmit information from the apparatus regarding at least one operating band combination;
determine a size of an indication of supported capabilities from a set of capabilities and a size of an indication of unsupported capabilities from the set of capabilities;
select by the apparatus either a supported indicator or an unsupported indicator regarding the information based on the determination of the size of the indication of supported capabilities from the set of capabilities and the size of the indication of unsupported capabilities from the set of capabilities; and
transmit the selected indicator by the apparatus.

10. An apparatus as in claim 9 where the information regarding the at least one operating band combination comprises at least one of:
an index comprising a plurality of operating band combinations; and
a bitmap relating to the index of operating band combinations.

11. An apparatus as in claim 9 where the information regarding the at least one operating band combination comprises capabilities regarding respective bands in the at least one operating band combination.

12. An apparatus as in claim 9 where the at least one memory and the computer program code are configured to, with the at least one processor, cause the apparatus to transmit an indication regarding carrier aggregation (CA) and/or dual connectivity (DC) and/or LTE-WLAN Aggregation (LWA) operating band combinations for at least one number of component carriers (CC), and where the information regarding the at least one operating band combination comprises capability information regarding the carrier aggregation (CA) and/or dual connectivity (DC) and/or LTE-WLAN Aggregation (LWA) operating band combinations for the at least one number of component carrier (CC).

13. An apparatus as in claim 9 where the at least one memory and the computer program code are configured to, with the at least one processor, cause the apparatus to:
after transmitting the information and the selected indicator, receive by the apparatus a request for capability information regarding a selected one of the at least one operating band combination; and
transmit from the apparatus capability information for the apparatus regarding respective bands of the selected operating band combination.

14. An apparatus as in claim 9 where the at least one memory and the computer program code are configured to, with the at least one processor, cause the apparatus to, before transmitting the information and the selected indicator, transmit by the apparatus a maximal supported component carrier (CC) band combination.

15. An apparatus as in claim 9 where the at least one memory and the computer program code are configured to, with the at least one processor, cause the apparatus to transmit by the apparatus carrier aggregation (CA) and/or dual connectivity (DC) and/or LTE-WLAN Aggregation (LWA) operating band combinations supported by the apparatus, and receiving by the apparatus a request for the information and selected indicator regarding at least one of the supported carrier aggregation (CA) and/or dual connectivity (DC) and/or LTE-WLAN Aggregation (LWA) operating band combinations.

16. A method comprising:
receiving by an apparatus information from a device regarding at least one operating band combination;
receiving by the apparatus an indicator, where the indicator comprises either a supported indicator or an unsupported indicator, wherein the indicator is determined based on a size of an indication of supported capabilities from a set of capabilities and a size of an indication of unsupported capabilities from the set of capabilities; and
interpreting the information, based upon the indicator, as the device either supporting the information regarding the at least one operating band combination or not supporting the information regarding the at least one operating band combination.

17. A method as in claim 16 where the information received by the apparatus comprises at least one of:
an index comprising a plurality of operating band combinations; and
a bitmap relating to the index of operating band combinations.

18. A method as in claim 16 further comprising:
selecting by the apparatus, based at least partially on the received information, one of the at least one operating band combination; and
transmitting a request from the apparatus for further capability information regarding the selected operating band combination.

19. An apparatus comprising:
at least one processor; and
at least one non-transitory memory including computer program code, the at least one memory and the computer program code configured to, with the at least one processor, cause the apparatus to:
receive by the apparatus information from a device regarding at least one operating band combination;
receive by the apparatus an indicator, where the indicator comprises either a supported indicator or an unsupported indicator, wherein the indicator is determined based on a size of an indication of supported capabilities from a set of capabilities and a size of an indication of unsupported capabilities from the set of capabilities; and
interpret the information, based upon the indicator, as the device either supporting the information regarding the at least one operating band combination or not supporting the information regarding the at least one operating band combination.

20. An apparatus as in claim 19 where the information received by the apparatus comprises at least one of:
an index comprising a plurality of operating band combinations; and
a bitmap relating to the index of operating band combinations.

* * * * *